United States Patent [19]
Madey

[11] Patent Number: 5,973,811
[45] Date of Patent: *Oct. 26, 1999

[54] DISCRIMINATION MULTI-CHANNEL INFRARED SIGNAL DETECTOR AND SYSTEMS UTILIZING THE SAME

[75] Inventor: Julius M. J. Madey, Hillsdale, N.Y.

[73] Assignee: Talking Signs, Inc., Baton Rouge, La.

[ * ] Notice: This patent is subject to a terminal disclaimer.

[21] Appl. No.: 08/775,138

[22] Filed: Dec. 31, 1996

Related U.S. Application Data

[63] Continuation-in-part of application No. 08/496,970, Jun. 30, 1995, Pat. No. 5,623,358.

[51] Int. Cl.$^6$ .................................................. H04B 10/00
[52] U.S. Cl. ........................ 359/154; 359/172; 359/189; 250/214 AL
[58] Field of Search ..................................... 359/152, 172, 359/153, 113, 154, 189; 250/214 AL, 214 B, 214 DC; 356/141; 340/825.72

[56] References Cited

U.S. PATENT DOCUMENTS

| | | | |
|---|---|---|---|
| 4,648,131 | 3/1987 | Kawaguchi et al. | 359/152 |
| 4,882,770 | 11/1989 | Miyahira et al. | 455/603 |
| 4,977,619 | 12/1990 | Crimmins | 359/172 |
| 5,012,086 | 4/1991 | Barnart | 250/212.1 |
| 5,027,433 | 6/1991 | Mendier et al. | 359/154 |
| 5,095,382 | 3/1992 | Abe | 359/189 |
| 5,253,095 | 10/1993 | Menadier et al. | 359/174 |
| 5,455,702 | 10/1995 | Reed et al. | 359/152 |
| 5,495,357 | 2/1996 | Osterhnout | 359/152 |
| 5,623,358 | 4/1997 | Madey | 359/172 |

OTHER PUBLICATIONS

Lettor—Royal National Institute for the Blind—1 pg.—Jan. 16, 1995.
Resolution of American Council of the Blind—1 pg. Approved Jul. 6, 1990.
Resolution of Board of Suporvisors of San Francisco—3 pgs. (on 2 sheets) —Approved Apr. 24, 1992..
Brochure headed "Talking Signs® . . . they speak for themselves"—8 pgs.—Copyright 1994.
Talking Signs—Brochure—2 pgs.—Undated.
Talking Signs, Inc.—"Overview"—1 pg. and—"Accessible City Project, San Francisco"—1 pg. —All undated.
Letter from City and County of San Francisco—1 pg.— Dated Mar. 1, 1993.
Talking Signs, Inc.—"For Immediate Release"—1 pg.— Undated.
"Winning Solutions"—"1994 PTI Technology Achievement Awards"—Brochure—2 pgs.—Undated.
Excerpt from San Francisco Examiner—Bill Mandel Column—1 pg.—Present copy Undated.
Smith–Kettlewell Eye Research Institute, Bart & Muni— News Release—3 pgs.—Sep. 9, 1994.
Article from The Urban Tarnsportation Monitor—1 pg.— Sep. 30, 1994.
Reprint from Identity magazine—4 pgs.—Reprinted from Mar./Apr. 1994 issue.

(List continued on next page.)

*Primary Examiner*—Rafael Bacares
*Attorney, Agent, or Firm*—John F. Sieberth; R. Andrew Patty, II

[57] ABSTRACT

A portable directional multi-channel receiver comprises a non-visual communicator, a self-contained source of electrical energy, a detector for receiving an amplitude modulated lightwave signal with at least two different frequency modulated subcarrier frequencies, and electronics converting the received signals into intelligible non-visual communication emanating from the communicator both in the presence and in the absence of an ambient background of light energy, such as sunlight. The device is adapted for use by the visually impaired, as well as those who are not fluent in the relevant printed language, in finding desired locations from which suitable modulated infrared signals are emitted.

9 Claims, 12 Drawing Sheets

OTHER PUBLICATIONS

The Beach News, vol. 9, No. 2, p. 5—1 pg.—Jan. 12, 1995.

Excerpt from San Francisco Examiner—"Now aid for the blind"—1 pg.—Present copy Undated.

Newspaper article "Cleaning way for blind"—1 pg.—Present copy Undated.

Apparent excerpt from Identity Magazine "A Light in the Darkness"—Present copy Undated.

Excerpt from Cape Cod Times "High–tech signs [talk]to blind"—1 pg.—Oct. 6, 1994.

Excerpt from Manchester Evening News "Bosses help by talking shop"—1 pg.—Nov. 6, 1993.

Talking Signs, Inc.—Technical Data Sheet—1 pg.—Undated.

Report: Smith–Kettlewell Eye Research Institute, Rehabilitation Engineering Center—11 pgs.—Mar. 15, 1991.

Paper entitled "Infrared Remote Signage Application for Transit Accessibility"—3 pgs.—Undated.

FIG. 4D

DISCRIMINATION MULTI-CHANNEL INFRARED SIGNAL DETECTOR AND SYSTEMS UTILIZING THE SAME

REFERENCE TO RELATED APPLICATION

This is a continuation-in-part of prior copending U.S. patent application Ser. No. 08/496,970 filed on Jun. 30, 1995.

TECHNICAL FIELD

This invention relates to improvements in the art of optoelectronics, and more particularly to an improved multi-channel detector and detection method for lightwave signals, especially infrared signals, in the presence of an ambient background of light energy such as sunlight.

BACKGROUND

Until relatively recently, persons who are blind, have low vision or are learning disabled or otherwise print handi-capped are denied access and orientation that the general population takes for granted in every day life. Finding their way is a challenging event often ending with asking strangers' help. Whether getting on the right bus, finding a restroom or a telephone, determining directions to elevators or exits, crossing streets or understanding directories in public places, these populations are placed at a great disadvantage and often in danger. Directional "wayfinding" devices have not existed to provide them the ability to "read and see" remote signs, much less utilize interactive signs, automatic teller machines, informational and commercial kiosks, vending machines, and the like. In addition, tourists and other visitors who are not fluent in the local language are often at a similar disadvantage since the relevant printed signs or displays employ a language which is not intelligible to them.

In recent years an information and wayfinding system has been developed for assisting blind, low-visioned and otherwise print-handicapped individuals. The system, marketed under the trademark Talking Signs, consists of single channel infrared transmitters and receivers. Transmitters are placed on key signs in the environment which continually transmit the message of the sign. The receiver is carried by the person who activates it when direction or information is desired.

Under many circumstances, the foregoing system provides excellent results in use. However when used in the presence of an ambient background of light energy such as sunlight, difficulties may be encountered, such as difficulty or, possibly, inability to detect the intended signal. Thus a need exists for a way of nullifying the adverse effect of such background light energy so that detection units can be utilized effectively both in the presence and in the absence of an ambient background of intense light energy such as sunlight. In addition, a need exists for a way to receive signals transmitted at various carrier frequencies, thereby enabling transmission and reception of multiple messages or multiple versions (e.g., different languages) of the same message.

This invention is deemed to fulfill these needs in a highly efficient manner.

SUMMARY OF THE INVENTION

In one of its embodiments, this invention provides a portable directional receiver which comprises a non-visual communicator (e.g., a speaker), a self-contained source of electrical energy, a detector for selectively receiving an amplitude modulated lightwave signal with at least two different frequency modulated subcarrier frequencies, and electronics converting said signals into intelligible communication (e.g., speech) emanating from said communicator both in the presence and in the absence of an ambient background of light energy. Such background energy can even be sunlight.

Another embodiment provides a system which comprises:

a) one or more arrays of single and/or multiple channel emitters, each of the emitters delivering an amplitude modulated infrared signal in the pattern of a cone having a beam width in the range of about 10° to about 50°, said infrared signal being amplitude modulated by a frequency modulated subcarrier in the range of about 25 KHz to about 1 MHz with a band width of no less than about 6 KHz and an infrared carrier frequency in the range of about 850 to about 950 nanometers, the arrays delivering their respective amplitude modulated infrared signals with at least two different frequency modulated subcarriers; and b) a portable directional receiver which comprises a non-visual communicator, a self-contained source of electrical energy, first means for detecting, selectively receiving and converting said amplitude modulated infrared signals into intelligible non-visual communication emanating from said communicator, and second means for nullifying the adverse effect of ambient background light energy, said second means further comprising an active sink for ambient light-induced steady state detector photocurrent and a PIN photodiode operated in the photovoltaic mode.

These and other embodiments and features of this invention will be still further apparent from the ensuing description, appended claims and accompanying drawings.

DESCRIPTION OF PREFERRED EMBODIMENTS

The receivers of the invention are especially adapted for use with one or more arrays of single or multiple channel lightwave emitters. Preferably, each of the emitters continuously delivers an amplitude modulated infrared signal in the pattern of a cone having a beam width in the range of about 10° to about 50°. It is also preferred that the infrared signal be amplitude modulated by a frequency modulated subcarrier in the range of about 25 KHz to about 1 MHz with a band width of no less than about 6 KHz and an infrared carrier frequency in the range of about 850 to about 950 nanometers. The array or arrays preferably deliver their respective amplitude modulated infrared signals with at least two different frequency modulated subcarriers. By placing the emitters in an array, the cumulative beam width of the signal emitted may be as high as 360° and/or have a whole or partial sphere configuration to maximize surrounding area coverage. While square wave or shaped sine wave amplitude modulation of the subcarrier frequency may be used, shaped sine wave amplitude modulation is preferred. These emitters can be placed at suitable locations so that a sight-impaired user of the receiver of this invention can sense the signal and be led to the desired location by intelligible communication generated in the receiver.

The non-visual communicator of the directional receiver can be of various types such as a Morse code cell, a tactile braille communicating device or any other electromechanical conversion device. Preferably however it is a small audio speaker or earphone system. When the communicator is an audio or earphone speaker system, the electronics of the receiver converts the sensed signal into intelligible speech emanating from the speaker system by converting the signal into an amplified time-varying detector signal photocurrent and delivering the amplified photocurrent to the speaker system to actuate the same.

As the self-contained source of electrical energy, the receiver will usually include one or more small electrical batteries. However, a suitable photovoltaic cell system for converting light energy into electrical energy for the receiver may be employed.

Figure 1A:
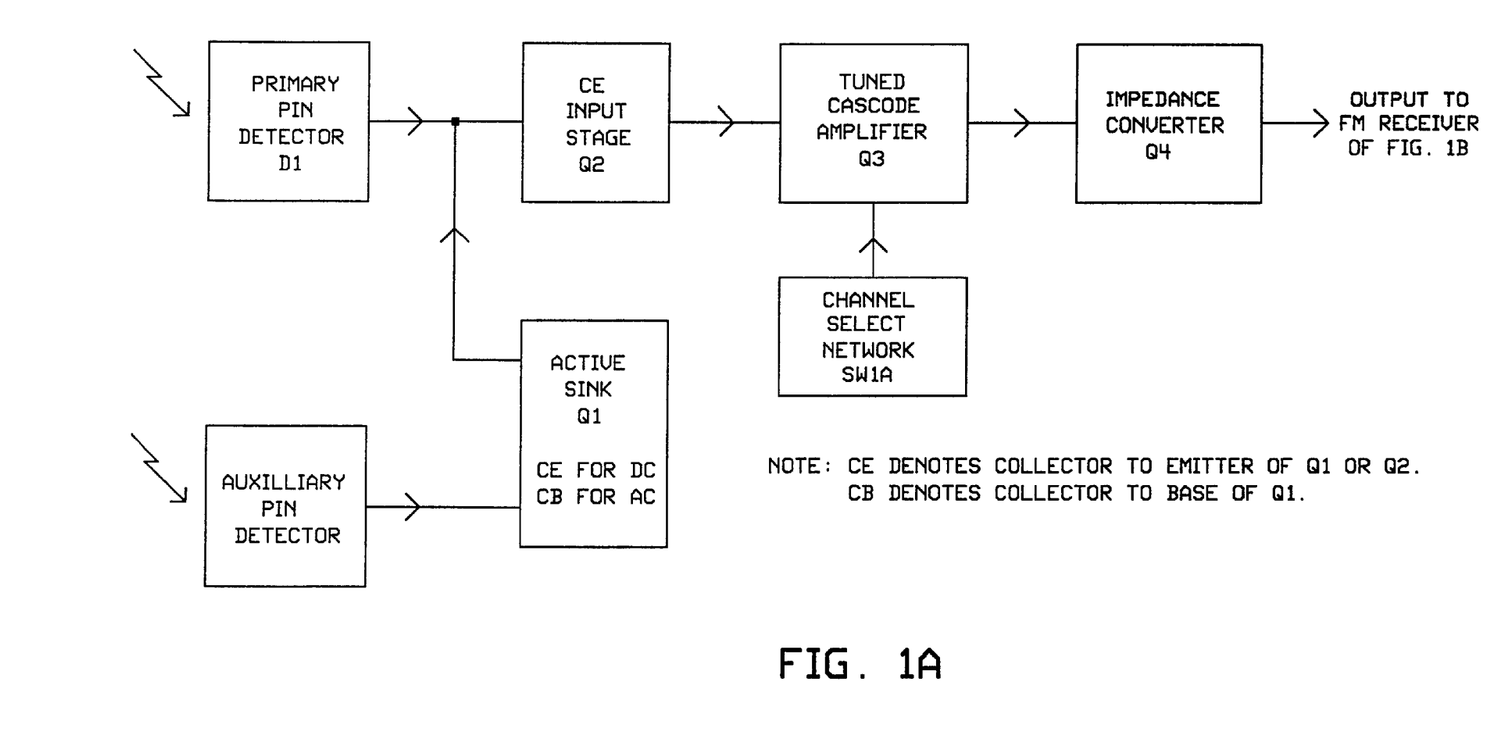
FIG. 1A is a block diagram of a typical front end (signal sensing and receiving portion) of a preferred receiver of this invention.

Referring now to the drawings, FIGS. 1A–1B and 2A–2D illustrate one preferred embodiment of this invention. With reference to FIG. 1A, a signal from one or more arrays of single or multiple channel emitters combined with ambient background radiation is received by primary PIN detector, D1. A auxiliary PIN detector, D2, receives ambient background radiation and cancels the ambient noise signal from primary PIN detector, D1, using active sink network of Q1. In essence, shot noise current due to the main PIN photodiode, the active sink and the auxiliary PIN photodiode are non-coherent and sum root mean square, while signal currents from the main and auxiliary PIN photodiodes are coherent and sum directly. Further, over a given design range, the steady state photocurrent of the auxiliary PIN photodiode does not contribute to the active sink current and, hence, does not produce additional shot noise in the active sink. The device of the figures thus utilizes a circuit topology in which the main PIN photodiode, D1, is operated in the reverse bias or photoresistive mode and the auxiliary PIN photodiode, D2, is operated in the photovoltaic mode. The active sink is typically a plurality of semiconductor devices such as transistors or integrated circuits. Further signal selection, conditioning and amplification is provided by input stage Q2, tuned cascode amplifier Q3 in combination with channel select network SW1A, and impedance converter Q4, respectively. The output from the impedance converter, Q4, is then directed to the FM receiver and squelch/mute network U2 and channel select network SW1B of FIG. 1B. The resulting audio/mute signal is amplified by audio power amplifier network U3. The output from the audio power amplifier network U3 is then used to actuate the speaker or other non-visual communicator. Both the FM receiver and squelch/mute network U2 and audio power amplifier network U3 are powered by power supply network U1.

Figure 1B:
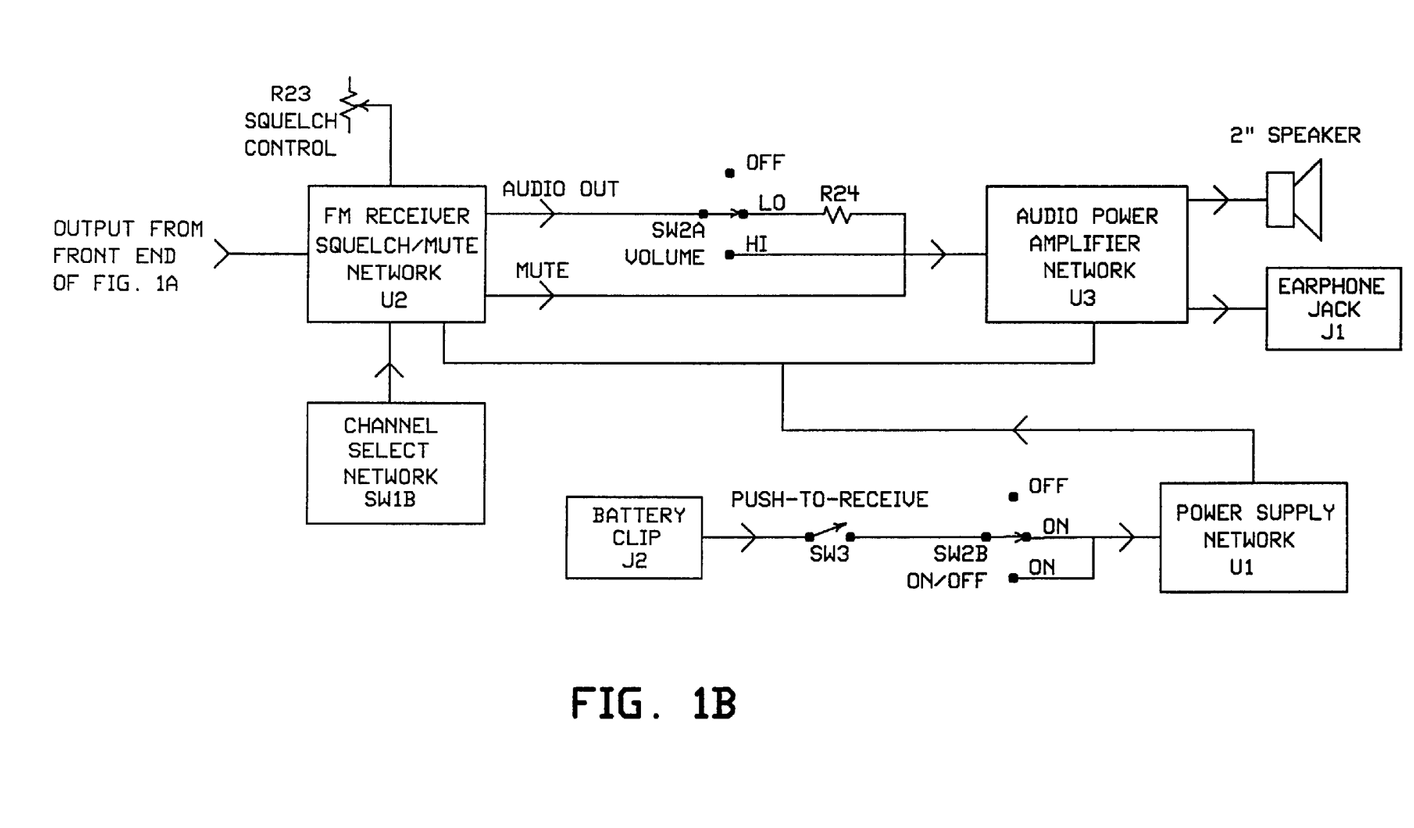
FIG. 1B is a block diagram of a means in the receiver of FIG. 1A for filtering and detecting the received signal and for squelching interference from ambient background noise.
Figure 2A:
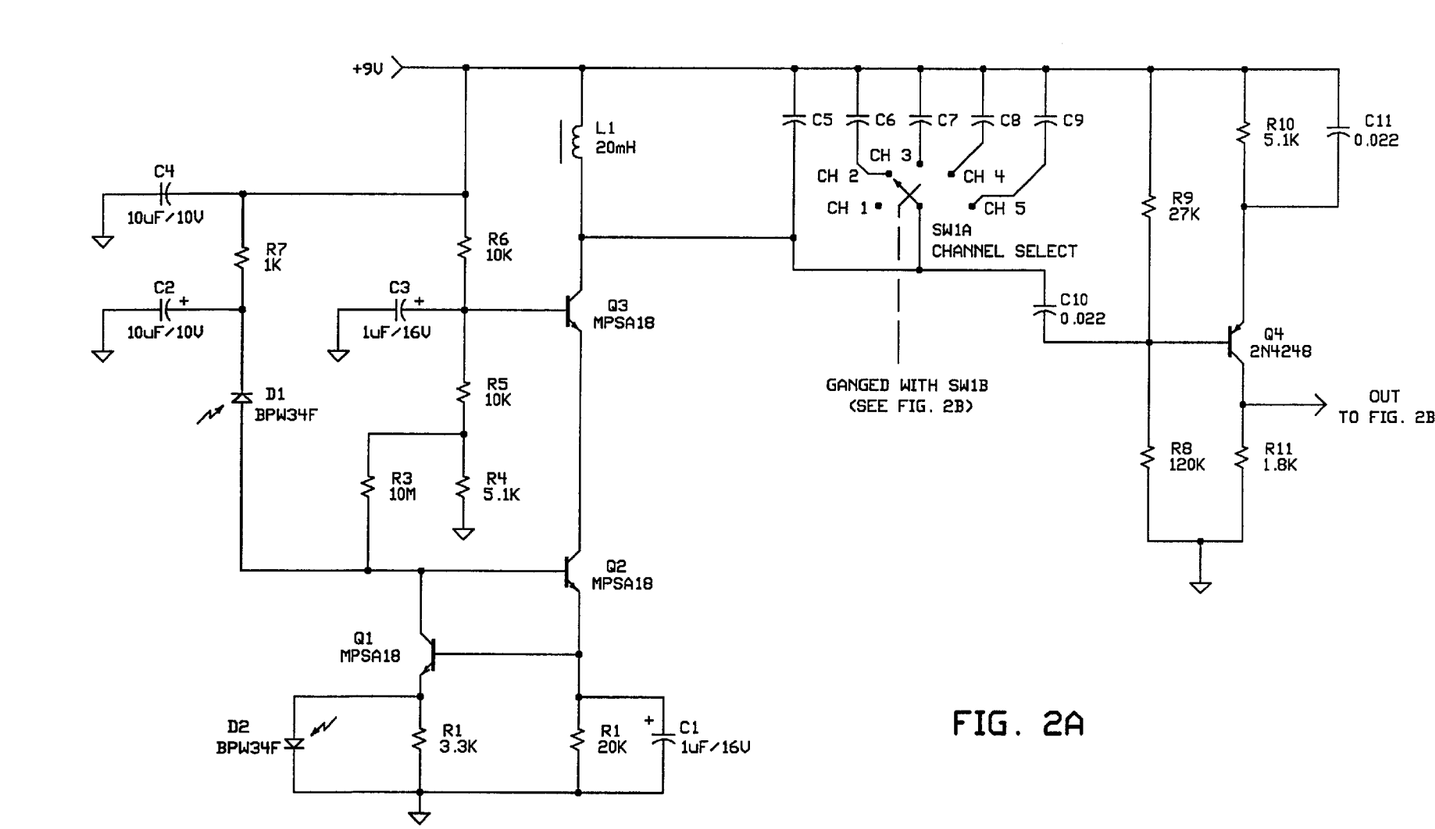
FIG. 2A is a detailed schematic diagram of the electronics of the front end of the receiver of FIG. 1A.
Figure 2B:
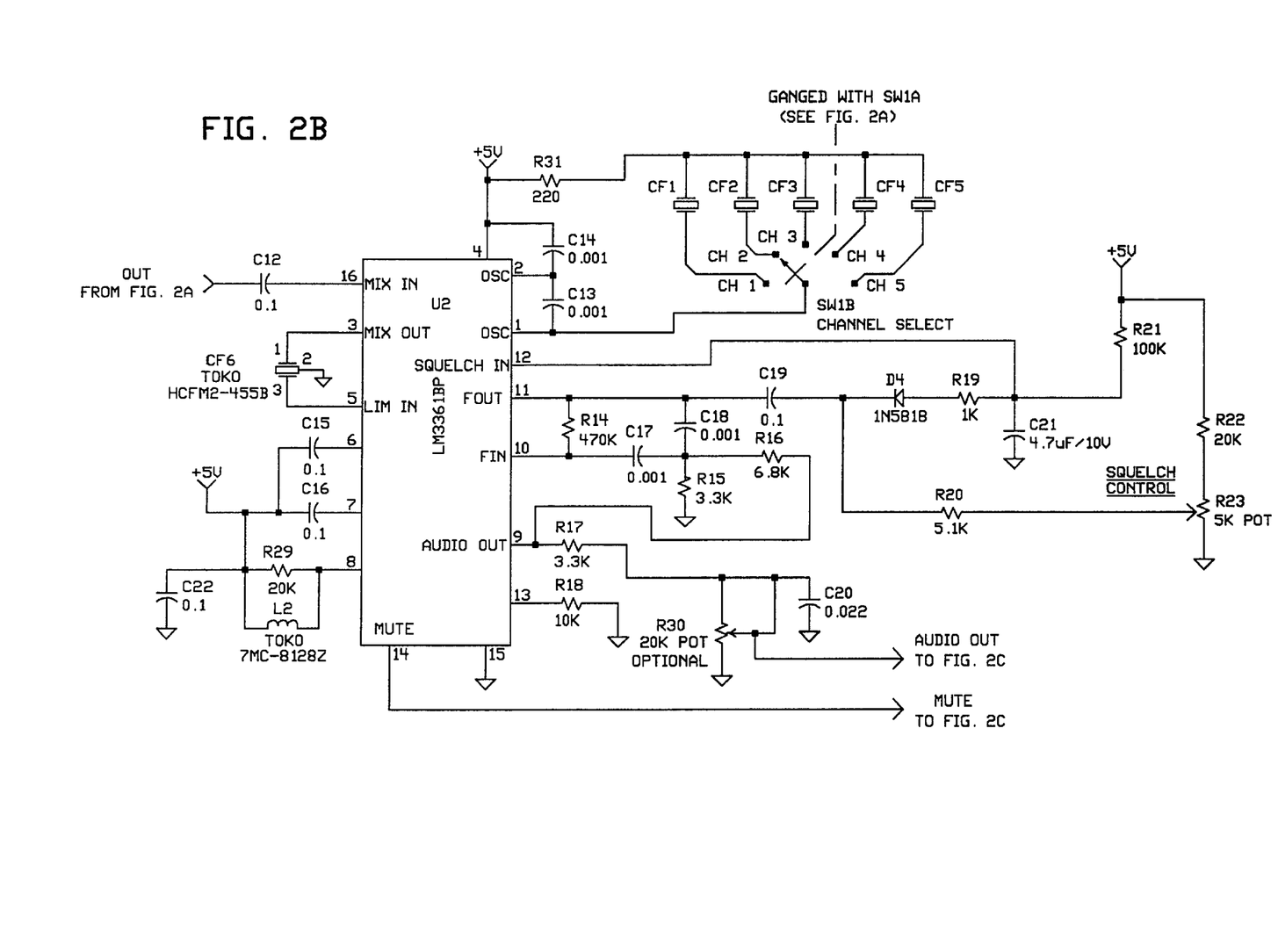
FIG. 2B, 2C and 2D, taken together, are a detailed schematic diagram of the electronics of the means of FIG. 1B.
Figure 2C:
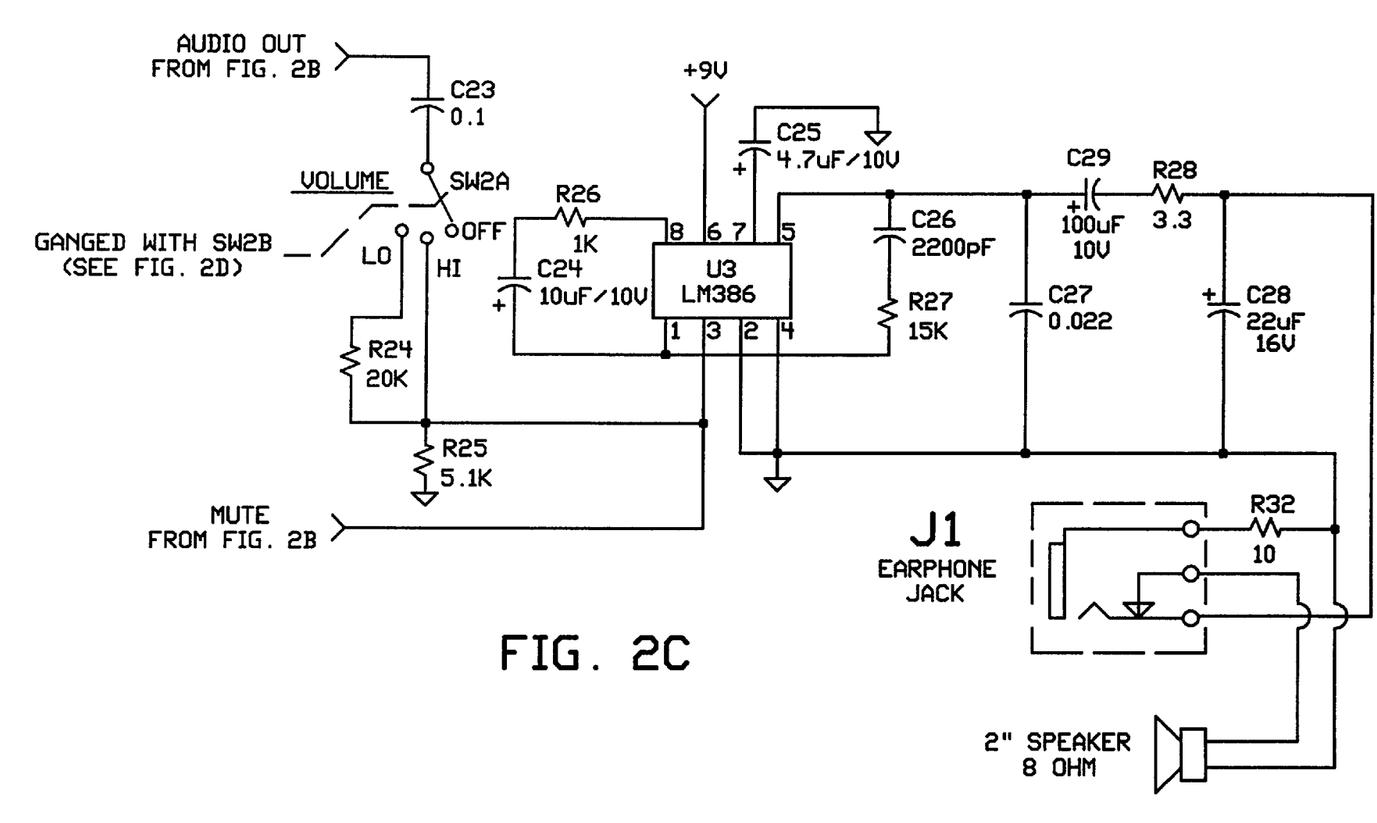
Figure 2D:
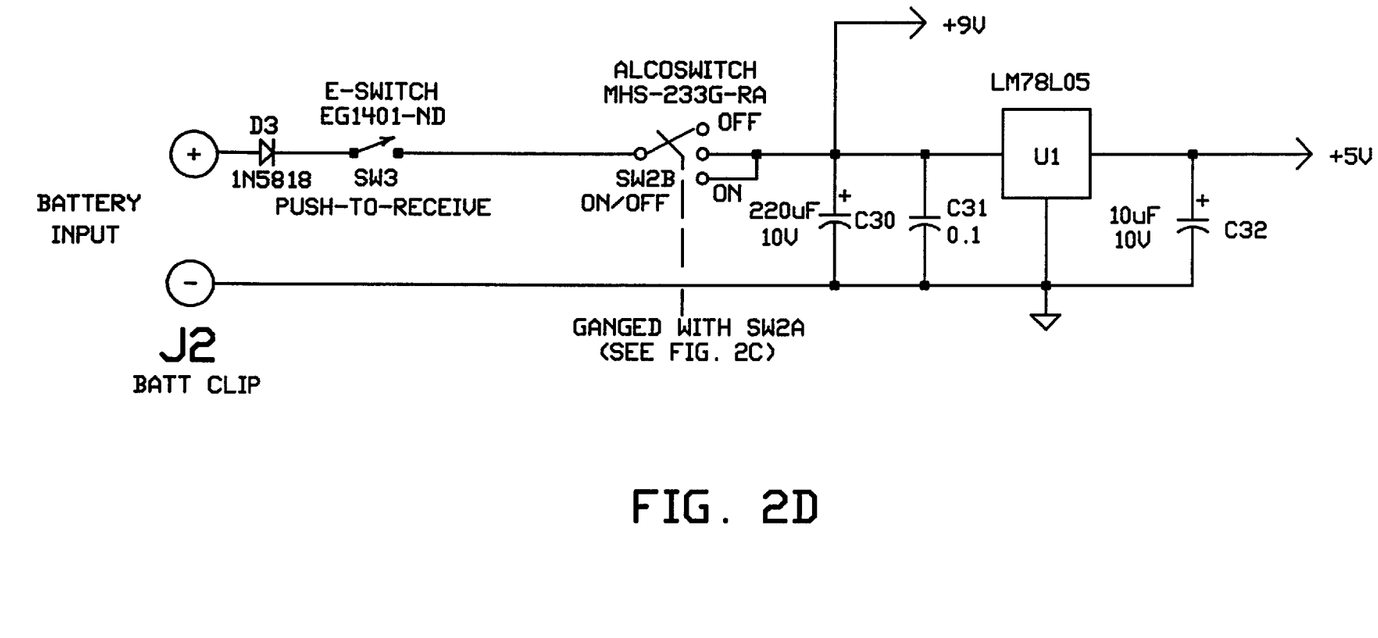

Complete details concerning the electronic circuitry referred to in FIGS. 1A are set forth in FIG. 2A, while complete details concerning the electronic circuitry referred to in FIG. 1B are set forth in FIGS. 2B through 2D. As seen in those Figures, channel select networks SW1A and SW1B are ganged switches, and may include 2 or more, preferably at least 5, channels for selection of concurrently emitted signals having amplitude modulated subcarrier frequencies in the range of about 25 KHz to about 1 MHz, more preferably 25 KHz to 250 Khz, with band widths of no less than about 6 KHz.

Figure 3A:
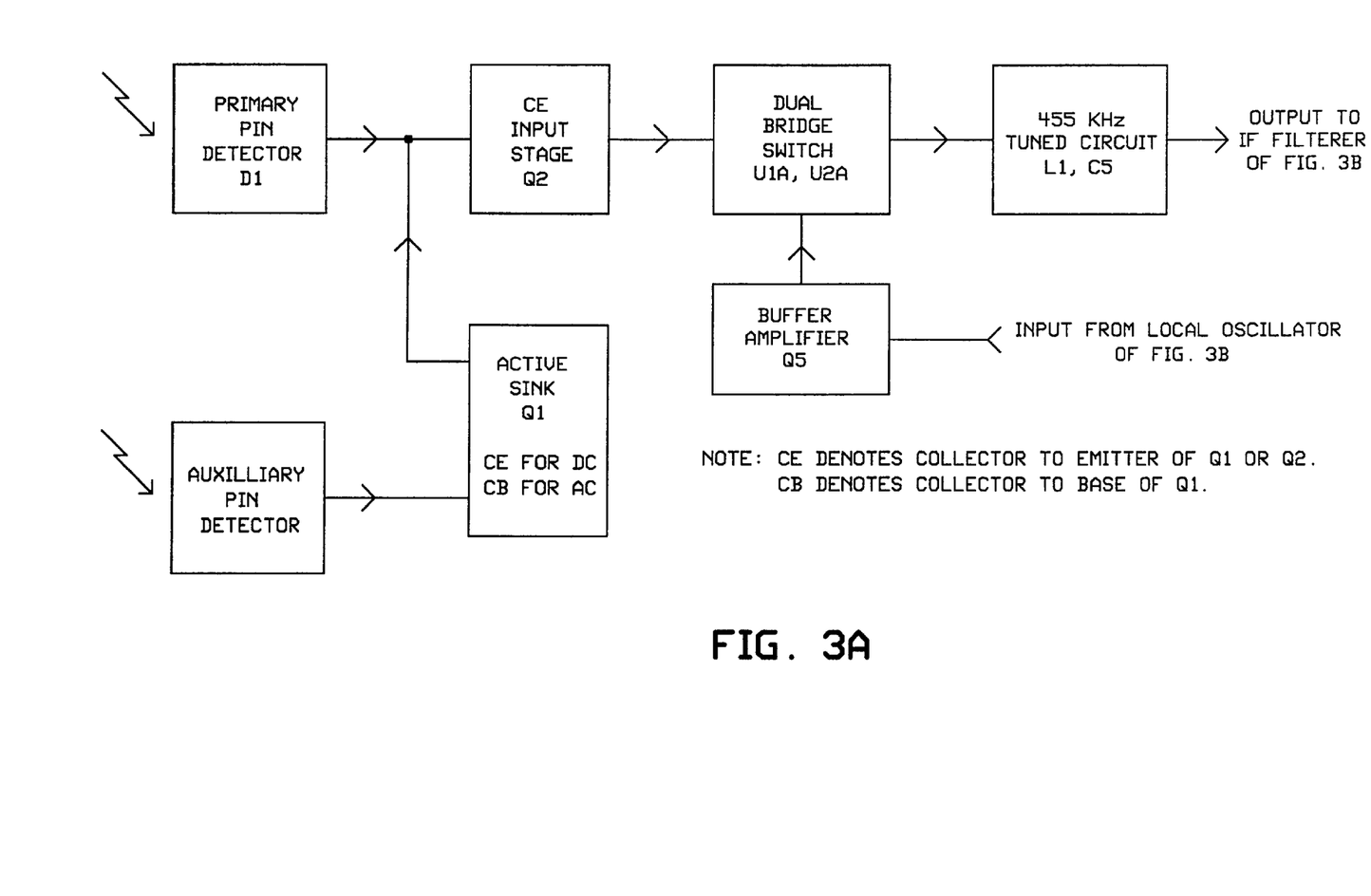
FIG. 3A is a block diagram of an alternative front end (signal sensing and receiving portion) of another preferred receiver of this invention.
Figure 3B:
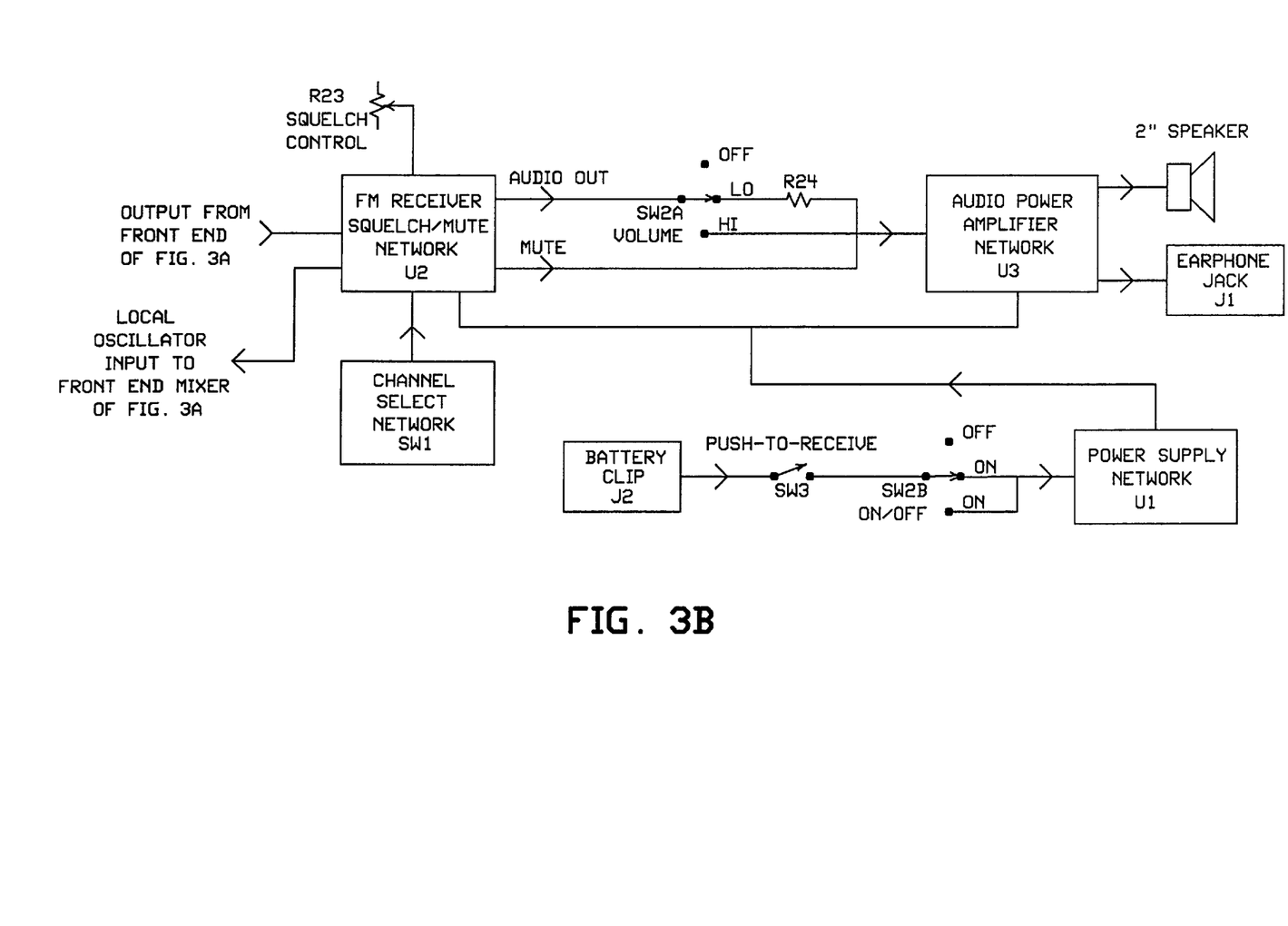
FIG. 3B is a block diagram of a means in the receiver of FIG. 3A for filtering and detecting the received signal and for squelching interference from ambient background noise.

FIGS. 3A–3B and 4A–4D illustrate another preferred embodiment of this invention. With reference to FIG. 3A, the primary difference between the embodiment illustrated in FIGS. 1A–2D can be seen after the output from input stage Q2. The tuned cascode amplifier Q3 and channel select network SW1A of FIG. 1A are replaced in FIG. 3A by a dual diode bridge switch U1A, U2A, a buffer Q5, and a 455 KHz tuned circuit L1, C5. Dual diode bridge switch U1A, U2A is further illustrated in FIG. 4A. The switches are conventional hot carrier diode rings driven by two transformers whose primaries are driven out of phase by buffer Q5, which in turn is driven by the oscillator output from FM receiver and squelch/mute network U2. The switching action, which occurs at the local oscillator rate of FM receiver and squelch/mute network U2, results in multiplication or mixing of the signal frequency from the front end and the local oscillator frequency to produce sum or difference frequencies at the chosen intermediate frequency of 455 KHz. Any low loss, fast, low capacitance switch, such as a CMOS N Channel/P Channel integrated pair, also may be used for U1A and U2A. FIG. 3B illustrates that, in this alternative embodiment, the output from the impedance converter, Q4, is also directed to the FM receiver and squelch/mute network U2 and channel select network SW1B of FIG. 3B. The resulting audio/mute signal is amplified by audio power amplifier network U3. The output from the audio power amplifier network U3 is then used to actuate the speaker or other non-visual communicator. As with the embodiment shown in FIG. 1B, both the FM receiver and squelch/mute network U2 and audio power amplifier network U3 are powered by power supply network U1.

Figure 4A:
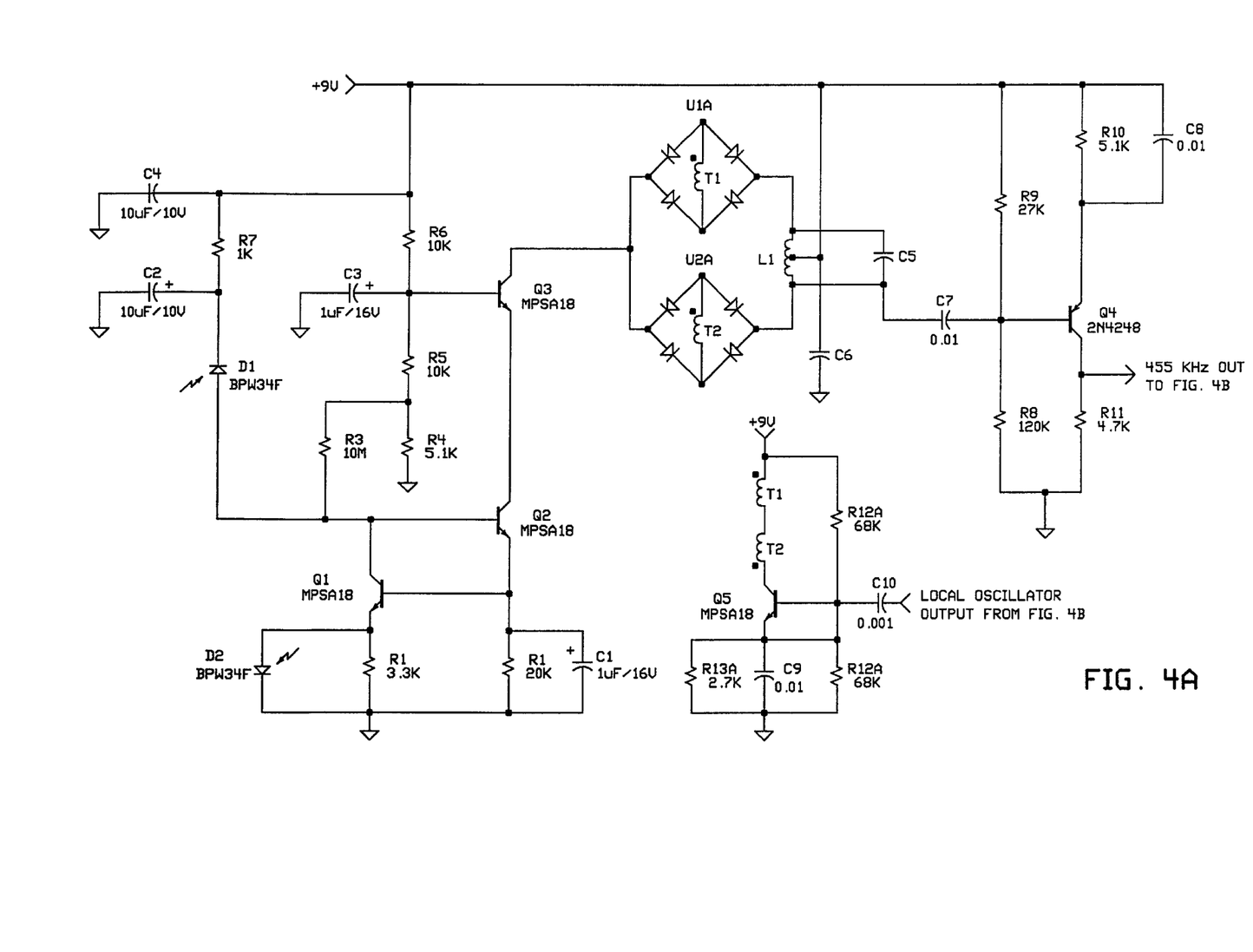
FIG. 4A is a detailed schematic diagram of the electronics of the front end of the receiver of FIG. 3A.
Figure 4B:
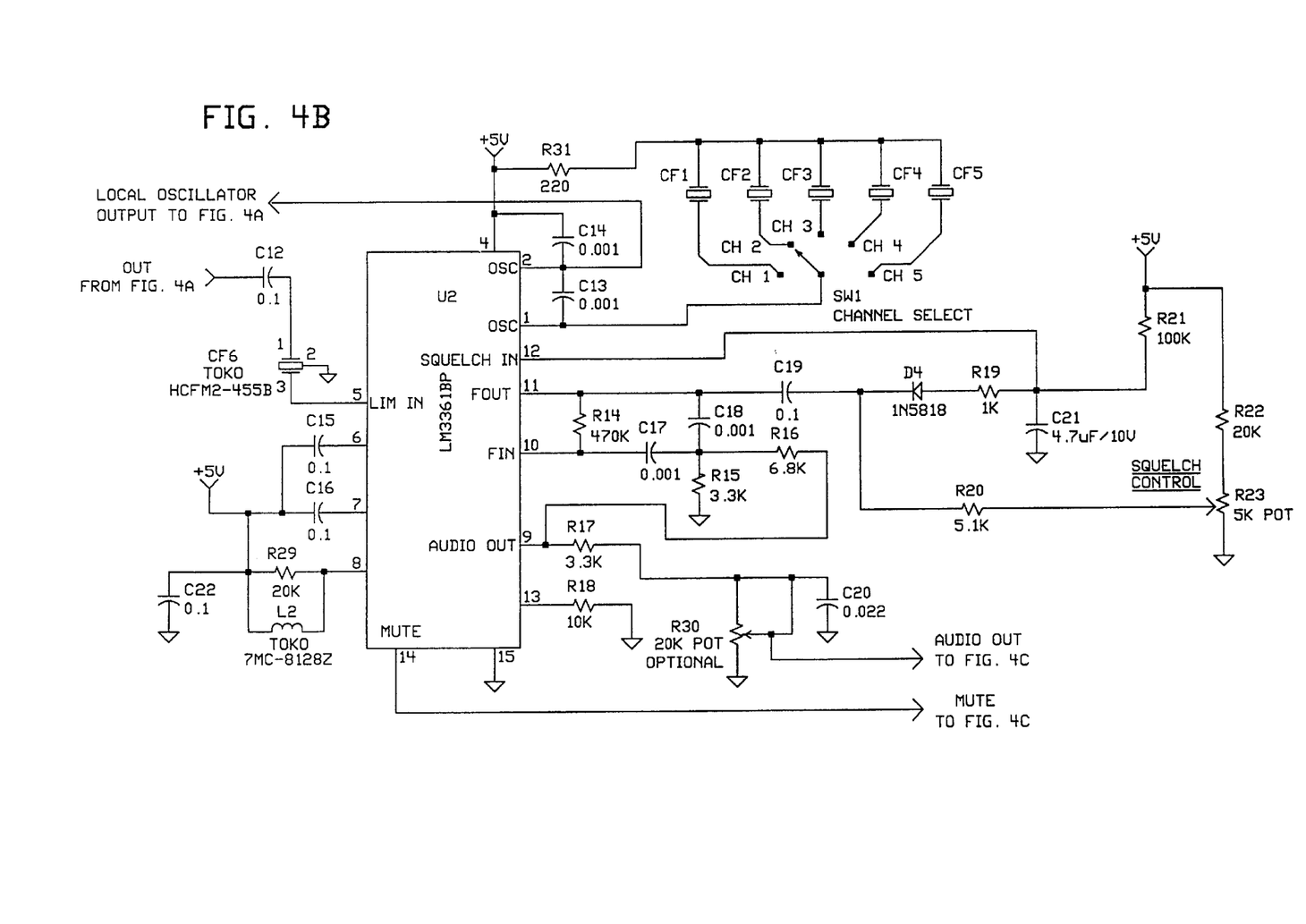
FIGS. 4B, 4C and 4D, taken together, are a detailed schematic diagram of the means of FIG. 3B.
Figure 4C:
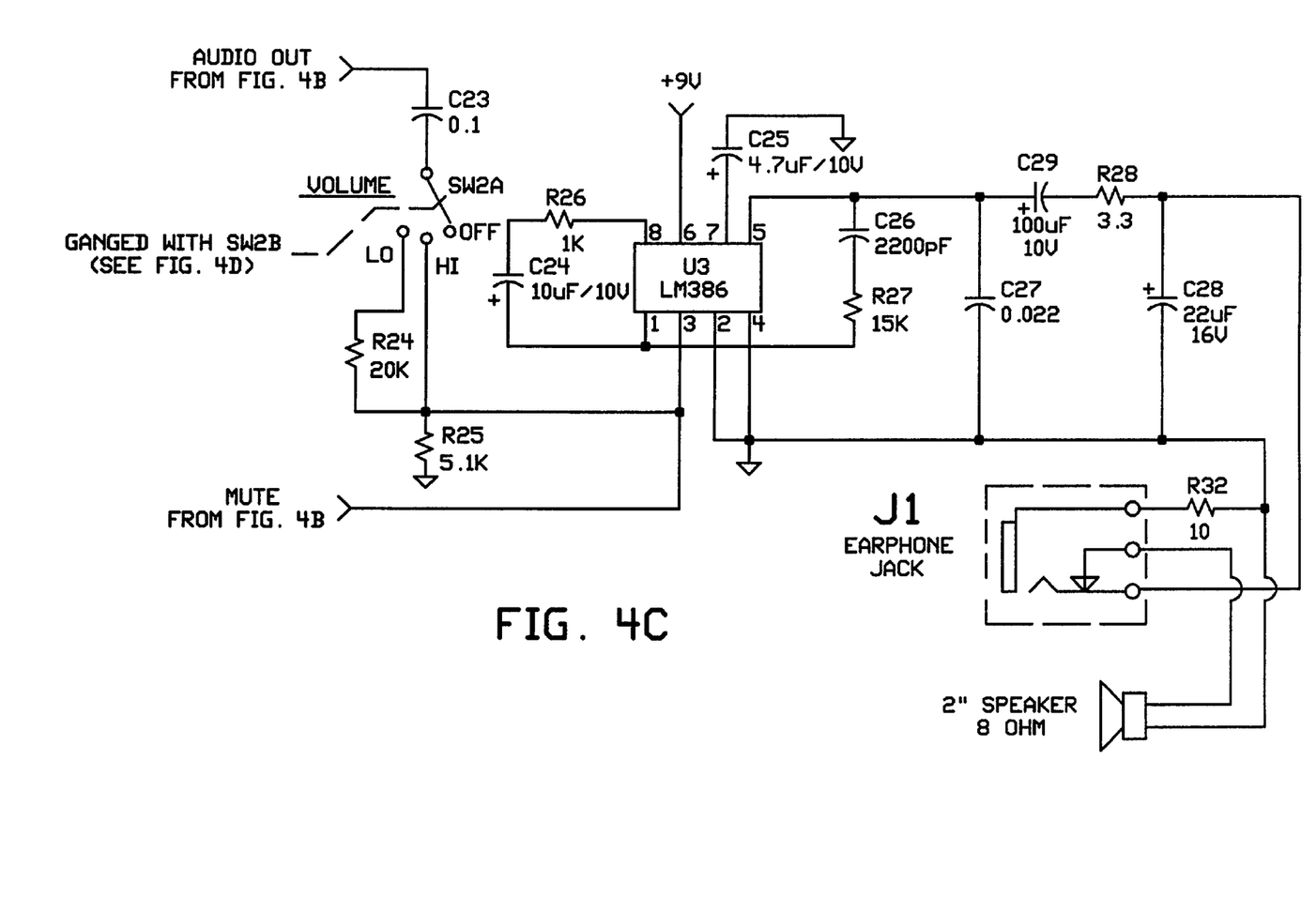
Figure 4D:
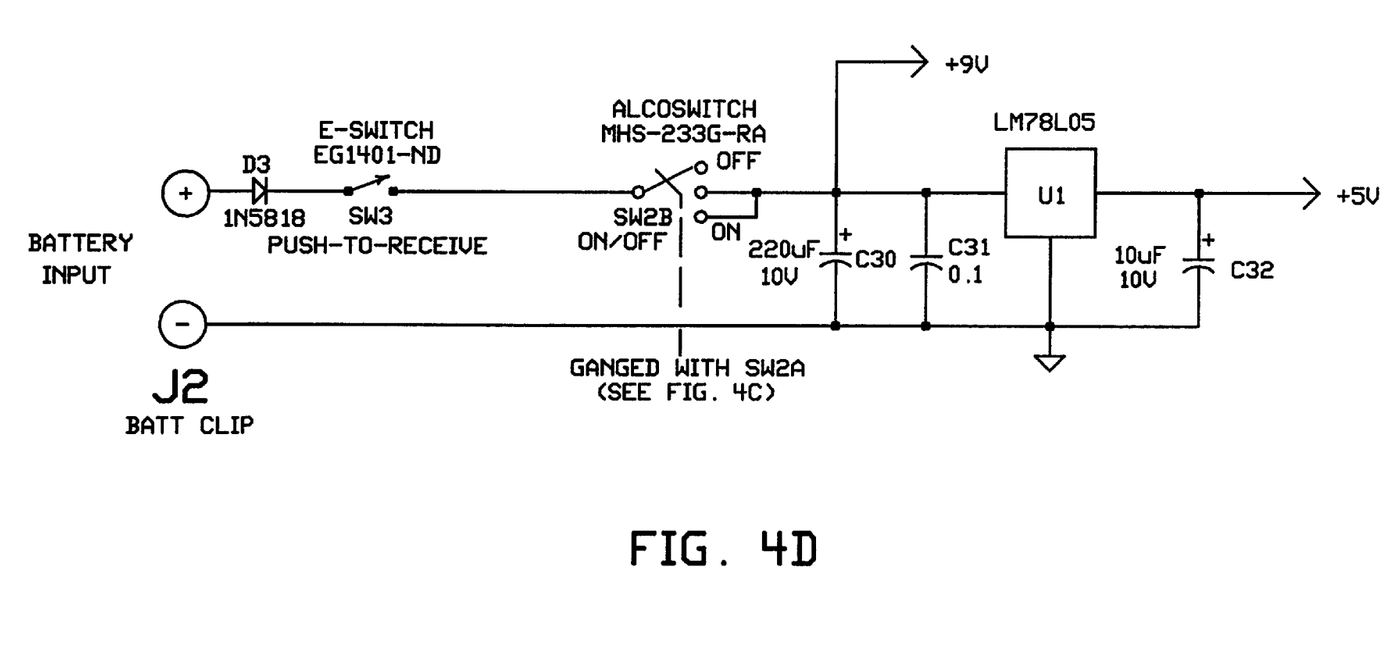

Complete details concerning the electronic circuitry referred to in FIG. 3A are set forth in FIG. 4A, while complete details concerning the electronic circuitry referred to in FIG. 3B are set forth in FIGS. 4B through 4D. As may be seen from FIGS. 3A–4D, one stage of selectivity at the intermediate frequency is provided by L1, C5 prior to the ceramic filter, CF6, in FIG. 4B. This additional stage of selectivity improves overall intermediate frequency bandpass response. Impedance convertor Q4 provides the correct input impedance to that ceramic filter. In this particular embodiment, only one switched frequency determining element, i.e., the resonators for channels 1 through 5 of FIG. 4B, is required.

In addition to the electronics detailed in these two embodiments for processing the frequency modulated subcarrier output from the front end of the receiver, digital signal processing electronics well known in the art could also be used in the receiver to convert the frequency modulated subcarrier output from the front end into intelligible audio signals.

A feature of this invention is that the electronics includes an active sink (e.g., broad band semiconductor devices) for ambient light-induced steady-state detector photocurrent which effectively removes the noise of ambient background noise resulting from ambient background of light energy such as sunlight. The device is therefore capable of detecting a signal that approaches the shot noise detection limit of a PIN photodiode in the presence of a steady state photocurrent. In doing so devices in forms such as those depicted in the Figures convert the sensed signal from a single or multiple channel emitter into intelligible speech emanating from the speaker by converting the signal into an amplified time-varying detector signal photocurrent and delivering the amplified photocurrent to the speaker to actuate the same.

Another feature of this invention is the ability to receive signals which may be transmitted at different frequency modulated subcarrier frequencies. In this way, operators of these receivers may select from among a variety of simultaneously transmitted signals and, therefore, from a variety of simultaneously transmitted messages, thereby providing expanded options for message transmission to a wider range of potential users. For example, the same message may be simultaneously transmitted at different frequency modulated subcarrier frequencies from recordings in different languages. An operator of a receiver of this invention will be free, then to select and receive the desired version of the message. In addition, if different messages are transmitted at different subcarrier frequencies, the receiver of this invention permits selection and reception of those signals so that each desired message transmitted at the subcarrier frequency of a selectable channel may be received and understood.

This invention is susceptible to considerable variation in its practice. Therefore the foregoing description is not intended to limit, and should not be construed as limiting, the invention to the particular forms of the invention described with reference to the Figures. Rather, what is intended to be covered is as set forth in the ensuing claims and the equivalents thereof permitted as a matter of law. In the claims, means-plus-function clauses are intended to cover the structures described herein as performing the cited function and not only structural equivalents but also equivalent structures.

What is claimed is:

1. A portable directional receiver which comprises a non-visual communicator, a self-contained source of electrical energy, a detector for selectively receiving an amplitude modulated lightwave signal with at least two different frequency modulated subcarrier frequencies, and electronics comprising an active sink for ambient light-induced steady state detector photocurrent, a primary PIN photodiode operated in the photoresistive mode, and a secondary PIN photodiode operated in the photovoltaic mode, said electronics converting said signals into intelligible non-visual communication emanating from said communicator both in the presence and in the absence of an ambient background of light energy, said receiver being effective as said signals approach the shot noise detection limit of said primary PIN photodiode in the presence of a steady state photocurrent.

2. A receiver according to claim 1 wherein said communicator is an audio or earphone speaker system and said electronics converts said signal into intelligible speech emanating from said speaker system by converting said signal into an amplified time-varying detector signal photocurrent and delivering said amplified photocurrent to said speaker system to actuate the same.

3. A receiver according to claim 1 wherein said active sink comprises broad band semiconductor devices.

4. A receiver according to claim 3 wherein said semiconductor devices are included within an integrated circuit.

5. A receiver according to claim 1 wherein said communicator is an audio speaker.

6. A portable directional receiver which comprises a speaker, a self-contained source of electrical energy, a detector comprising a PIN photodiode operated in the photoresistive mode for selectively receiving a plurality of frequency modulated lightwave signals transmitted at different amplitude modulated subcarrier frequencies, electronics converting said signals into intelligible speech emanating from said speaker, and a PIN photodiode operated in the photovoltaic mode for nullifying ambient light-induced steady-state detector photocurrent derived from ambient background light energy.

7. A system which comprises:

a) one or more arrays of single and/or multiple channel emitters, each of the emitters delivering an amplitude modulated infrared signal in the pattern of a cone having a beam width in the range of about 10° to about 50°, said infrared signal being amplitude modulated by a frequency modulated subcarrier in the range of about 25 KHz to about 1 MHz with a band width of no less than about 6 KHz and an infrared carrier frequency in the range of about 850 to about 950 nanometers, the arrays delivering their respective amplitude modulated infrared signals with at least two different frequency modulated subcarriers; and b) a portable directional receiver which comprises a non-visual communicator, a self-contained source of electrical energy, first means for detecting, selectively receiving and converting said amplitude modulated infrared signals into intelligible non-visual communication emanating from said communicator, and second means for nullifying the adverse effect of ambient background light energy, said second means comprising an active sink for ambient light-induced steady state detector photocurrent and a PIN photodiode operated in the photovoltaic mode.

8. A system according to claim 7 wherein said first means comprises a PIN photodiode operated in the photoresistive mode for detecting and receiving said frequency modulated infrared signals.

9. A system according to claim 8 wherein said first means converts said signals into intelligible speech.

* * * * *